(12) United States Patent
Wong et al.

(10) Patent No.: US 8,373,721 B2
(45) Date of Patent: Feb. 12, 2013

(54) METHOD OF REALISM ASSESSMENT OF AN IMAGE COMPOSITE

(75) Inventors: Bing-Yi Wong, Taipei (TW); Homer H. Chen, Taipei (TW); Chia-Kai Liang, Taipei (TW); Tai-Hsu Lin, Taipei (TW)

(73) Assignee: National Taiwan University, Taipei (TW)

(*) Notice: Subject to any disclaimer, the term of this patent is extended or adjusted under 35 U.S.C. 154(b) by 594 days.

(21) Appl. No.: 12/637,608

(22) Filed: Dec. 14, 2009

(65) Prior Publication Data

US 2011/0141353 A1 Jun. 16, 2011

(51) Int. Cl.
| | |
|---|---|
| G09G 5/00 | (2006.01) |
| G09G 5/02 | (2006.01) |
| G06K 9/00 | (2006.01) |
| G06K 9/40 | (2006.01) |
| G06K 9/36 | (2006.01) |
| G03F 3/08 | (2006.01) |
| G06T 7/00 | (2006.01) |
| H04N 1/46 | (2006.01) |
| H04N 1/40 | (2006.01) |
| H04N 5/202 | (2006.01) |
| H04N 5/445 | (2011.01) |
| H04N 9/64 | (2006.01) |

(52) U.S. Cl. ........ 345/591; 345/600; 345/604; 345/606; 345/624; 345/555; 348/254; 348/560; 348/565; 348/586; 348/672; 358/518; 358/522; 358/525; 358/540; 358/448; 382/166; 382/168; 382/235; 382/274; 382/300

(58) Field of Classification Search .......... 345/418–419, 345/428, 581, 589–591, 592–593, 600–604, 345/606, 610–611, 619, 624, 629–630, 640, 345/643, 660, 670, 472–472.1, 690, 547–549, 345/555; 348/254–257, 263, 552–553, 557, 348/560, 565, 577–586, 591, 598–600, 630–631, 348/655, 659–661, 668, 671–672, 674–657, 348/708; 358/515–518, 522, 525, 540, 447–448, 358/450, 453; 382/162, 166–167, 168–169, 382/173, 232, 235, 254, 274, 276, 251, 282–285, 382/293–296, 298–300, 305

See application file for complete search history.

(56) References Cited

U.S. PATENT DOCUMENTS 5,668,890 A * 9/1997 Winkelman .................. 382/167
6,009,209 A 12/1999 Acker et al.

(Continued)

FOREIGN PATENT DOCUMENTS

TW I255609 5/2006

OTHER PUBLICATIONS

M. J. Swain et al., "Color Indexing"—International Journal of Computer Vision (Nov. 1991), vol. 7, No. 1, pp. 11-32.

*Primary Examiner* — Wesner Sajous
(74) *Attorney, Agent, or Firm* — Stout, Uxa, Buyan & Mullins, LLP

(57) ABSTRACT

In a method of realism assessment of an image composite, the foreground and the background are transformed into a color space, such as YCbCr, followed by projecting the foreground and the background to a subspace represented by the axes representing chromatic information. The image composite is assessed in the projected subspace, according to linearity of color distributions of the foreground/the background, or according to distance between the color distributions of the foreground/the background and a center of the transformed color space.

20 Claims, 6 Drawing Sheets

U.S. PATENT DOCUMENTS

| | | | |
|---|---|---|---|
| 6,011,595 A * | 1/2000 | Henderson et al. | 348/590 |
| 6,262,742 B1 | 7/2001 | Tampieri | |
| 2002/0136447 A1* | 9/2002 | Link et al. | 382/163 |
| 2005/0180628 A1* | 8/2005 | Curry et al. | 382/164 |
| 2005/0180642 A1* | 8/2005 | Curry et al. | 382/232 |
| 2008/0068377 A1 | 3/2008 | Lindbloom | |
| 2008/0267529 A1* | 10/2008 | Bradburn | 382/282 |
| 2009/0033682 A1* | 2/2009 | Kaida et al. | 345/634 |
| 2009/0060331 A1* | 3/2009 | Liu et al. | 382/173 |
| 2009/0153659 A1* | 6/2009 | Landwehr et al. | 348/135 |
| 2009/0278859 A1* | 11/2009 | Weiss et al. | 345/629 |
| 2010/0007786 A1* | 1/2010 | Bhatia et al. | 348/441 |

* cited by examiner

METHOD OF REALISM ASSESSMENT OF AN IMAGE COMPOSITE

BACKGROUND OF THE INVENTION

1. Field of the Invention

The present invention generally relates to image compositing, and more particularly to realism assessment and recoloring of an image composite.

2. Description of Related Art

The composition of an image, or image composition, concerns the arrangement of different objects and visual elements within an image frame. A particular image composition can be tailored to create, for instance, a more visually compelling picture or a picture more readily or profoundly evoking the interest of a viewer.

Image compositing is a post-photographic operation, and is commonly performed by cut-and-paste. However, the resultant image composite often suffers from color incompatibility between the inserted or pasted object and the background of the image. As a result, the image composite as judged by a human being appears unrealistic.

In order to resolve this problem to make the inserted object more compatible with the background of the image, a number of schemes have been proposed. However, conventional schemes can suffer from one or more of excess complexity, inaccuracy, requirements of user interaction, and requirements of multiple auxiliary images during realism assessment. For the reason that conventional methods cannot effectively assess an image composite, a need has arisen to propose a novel method that is capable of economically, accurately, and/or automatically performing realism assessment of the image composite.

SUMMARY OF THE INVENTION

In view of the foregoing, it is an object of the embodiment of the present invention to provide a method of realism assessment of an image composite by providing a number of objective metrics. Moreover, the image composite may be further subjected to recoloring according to the realism assessment in order to improve the compatibility between an inserted object and the background of the image.

According to one embodiment, the foreground and the background are transformed into a color space, wherein the transformed color space has a first axis representing luminance information, and a second axis and a third axis representing chromatic information. The foreground and the background are projected to a subspace represented by the second axis and the third axis. The image composite is assessed, in the projected subspace, according to a linearity of color distribution of the foreground and a linearity of color distribution of the background, and further according to a relationship between the color distribution of the foreground and the color distribution of the background.

According to another embodiment, the foreground and the background are transformed into a color space, wherein the transformed color space has a first axis representing luminance information, and a second axis and a third axis representing chromatic information. Distances between color distributions of the foreground and the background respectively and a center of the transformed color space are measured as grayness. The image composite is assessed, in the transformed subspace, according to the measured grayness of the foreground and the grayness of the background.

According to a further embodiment, the foreground and the background are shrunk to obtain local color distributions of the foreground and the background. Color similarity between the shrunk foreground and the shrunk background are determined by histogram distance.

DETAILED DESCRIPTION OF THE INVENTION

Figure 1:
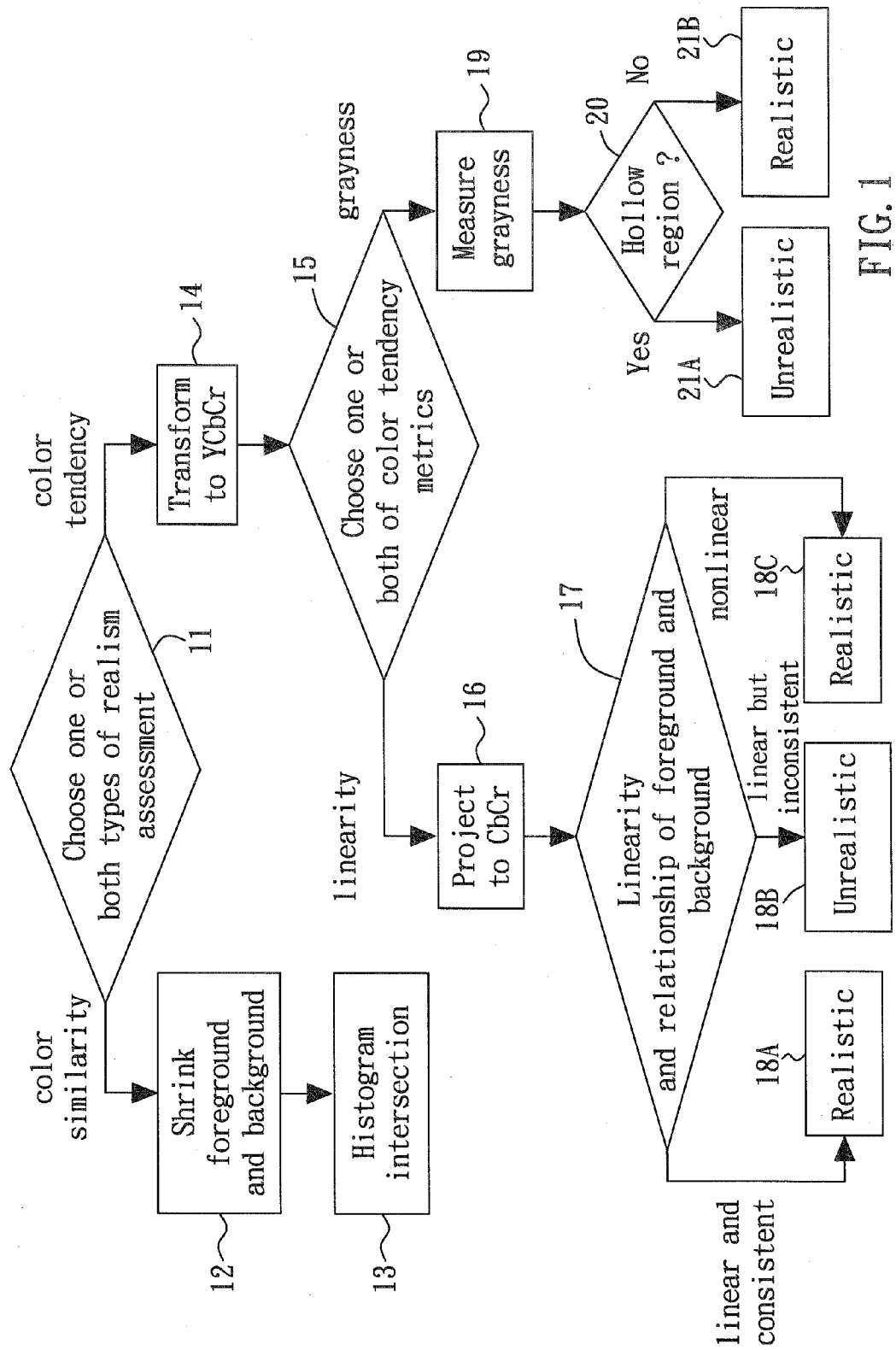
FIG. 1 is a flow diagram that illustrates a method of assessing realism of an image composite according to one embodiment of the present invention.

FIG. 1 is a flow diagram that illustrates a method of assessing realism of an image composite according to one embodiment of the present invention. In the embodiment, two types of realism assessment are disclosed: color similarity and consistence of color tendency. One or both types of realism assessment may be chosen (step 11) in order to assess an image composite.

Figure 2:
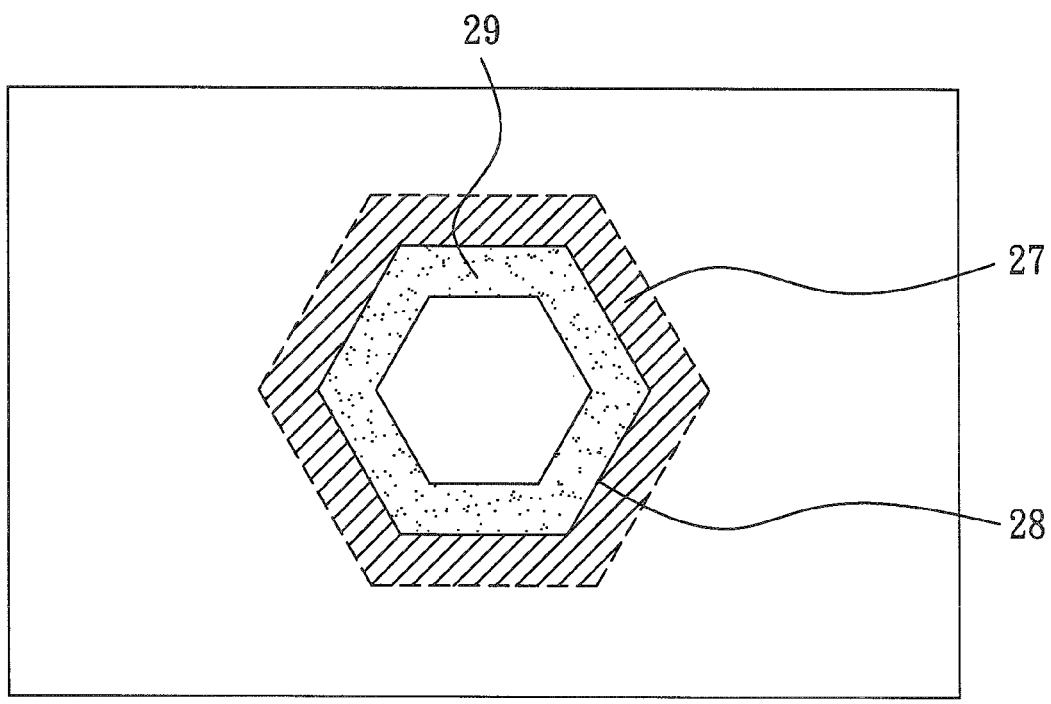
FIG. 2 shows a shrunk background and a shrunk foreground.

With respect to the color similarity, a foreground (e.g., an inserted object) and/or a background is firstly shrunk in step 12 in order to obtain local color distributions of the foreground and the background. As shown in FIG. 2, the shrunk background 27 is a band region outside (the boundary of) the inserted object 28, and the shrunk foreground 29 is a band region inside (the boundary of) the inserted object 28. The primary rationale for shrinking the foreground and the background is that the information of the faraway background region and/or central foreground is usually irrelevant to the realism assessment of the image composite. It is noted that the outer boundary of the shrunk background 27 and/or the inner boundary of the shrunk foreground 29 need not be similar to the boundary of the inserted object 28 in shape. Moreover, the amount of the area of the foreground and/or the background may depend on the requirements of specific applications.

Subsequently, in step 13, the color similarity between the shrunk foreground and the shrunk background may then be obtained. In the embodiment, the color similarity S of an image composite is obtained using histogram intersection (or commonly known as histogram distance), which may be expressed as $$S = \frac{\sum_{N_L} \sum_{N_a} \sum_{N_b} \min(h^B(i_L, i_a, i_b), h^F(i_L, i_a, i_b))}{\min(M^B, M^F)},$$

where $h^B(.)$ and $h^F(.)$, respectively, denote the three-dimensional (3-D) histograms of the shrunk background and the shrunk foreground in the CIE L*a*b* color space, $i_L$, $i_a$ and $i_b$ denote the indices of the histograms for the L, a, and b channels, respectively, $N_L$, $N_a$, and $N_b$ denote the numbers of the histogram bins for the L, a, and b channels, respectively, and $M^B$ and $M^F$ denote the magnitudes of the background and the foreground.

More on the use of histogram intersection/distance may be obtained by referring, for example, to a disclosure entitled "Color Indexing," International Journal of Computer Vision (November 1991), vol. 7, no. 1, pp. 11-32, by M. J. Swain et al., the disclosure of which is hereby incorporated by reference.

With respect to the consistence of color tendency, in step 14, the foreground and the background are respectively transformed, for example, into YCbCr color space. In the YCbCr color space, the Y axis represents luminance information, and the Cb axis and Cr axis represent chromatic information. It is appreciated by those skilled in the pertinent art that there are other suitable color spaces, such as YUV and L*a*b* color spaces, which are similar to the YCbCr color space and which may be adapted as well.

In the embodiment, two color tendency metrics are proposed: linearity and grayness. One or both of the color tendency metrics may be chosen (step 15) in order to determine the consistence of color tendency.

With respect to the linearity metric, the foreground and the background of an image composite are projected to CbCr subspace of the YCbCr color space (step 16). For example, a grayish image consisting of mostly achromatic pixels would lie around the origin in the CbCr subspace. The CbCr distribution of such image may be described by a line that passes through the origin. On the other hand, for example, a greenish image consisting of mostly achromatic pixels and green pixels would lie on the negative side of the Cr axis, so the CbCr distribution of such an image can be approximated by a line. In step 17, the image composite is assessed according to the linearity of color distribution of the foreground and the linearity of color distribution of the background, and also according to the relationship between the color distribution of the foreground and the color distribution of the background.

Figure 3A:
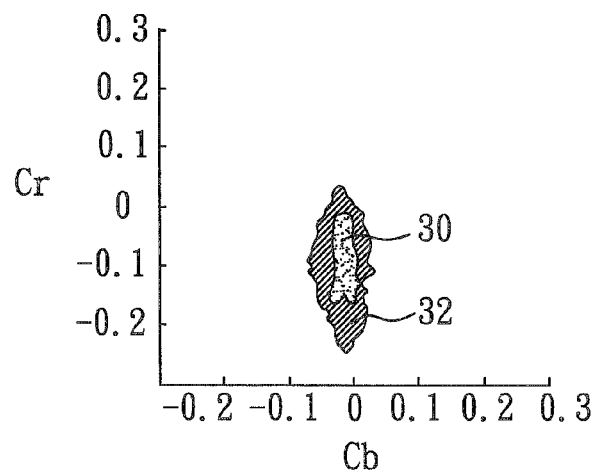
FIG. 3A to FIG. 3C show a number of foreground components and background components in the CbCr subspace.
Figure 3B:
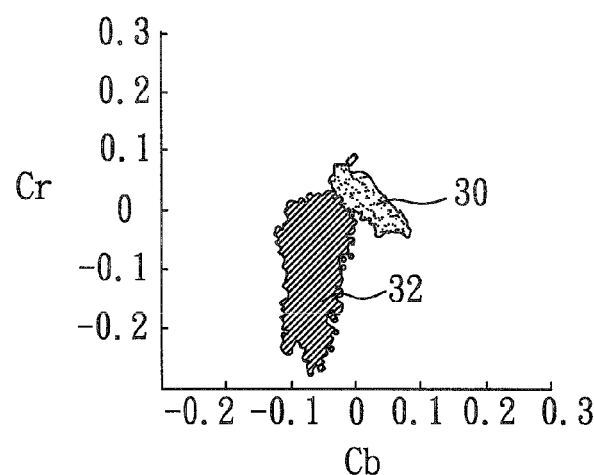
Figure 3C:
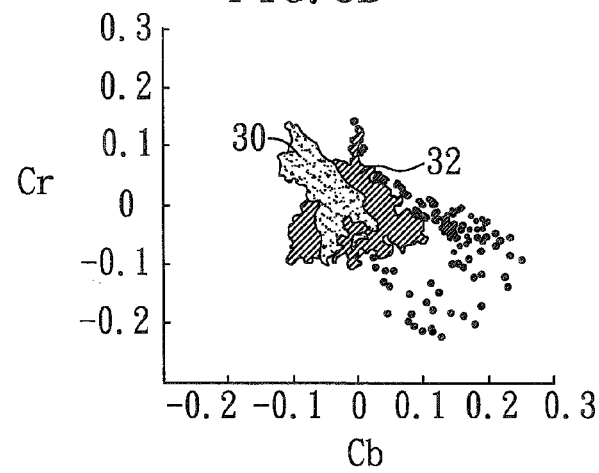

FIG. 3A shows a foreground component 30 and a background component 32 in the CbCr subspace. In this case (step 18A), both the foreground component 30 and the background component 32 have linearity, and they are approximately consistent (or coincided), indicating that they have high consistency of color tendency, and the image composite therefore may appear realistic. FIG. 3B further shows a foreground component 30 and a background component 32 in the CbCr subspace. In this case (step 18B), both the foreground component 30 and the background component 32 have linearity, but they are substantially different or inconsistent color distributions, indicating that they have low consistency of color tendency, and the image composite therefore may look unrealistic. FIG. 3C further shows a foreground component 30 and a background component 32 in the CbCr subspace. In this case (step 18C), neither the foreground component 30 nor the background component 32 has linear color distribution. As a result, the image composite may look realistic.

Figure 4A:
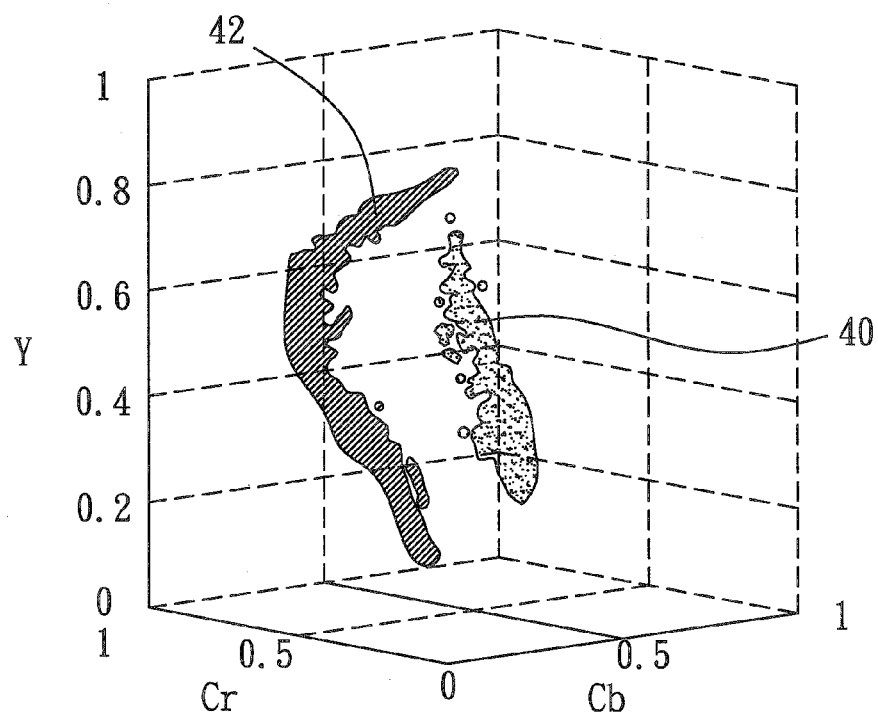
FIG. 4A and FIG. 4B show a number of foreground components and background components in the YCbCr color space.
Figure 4B:
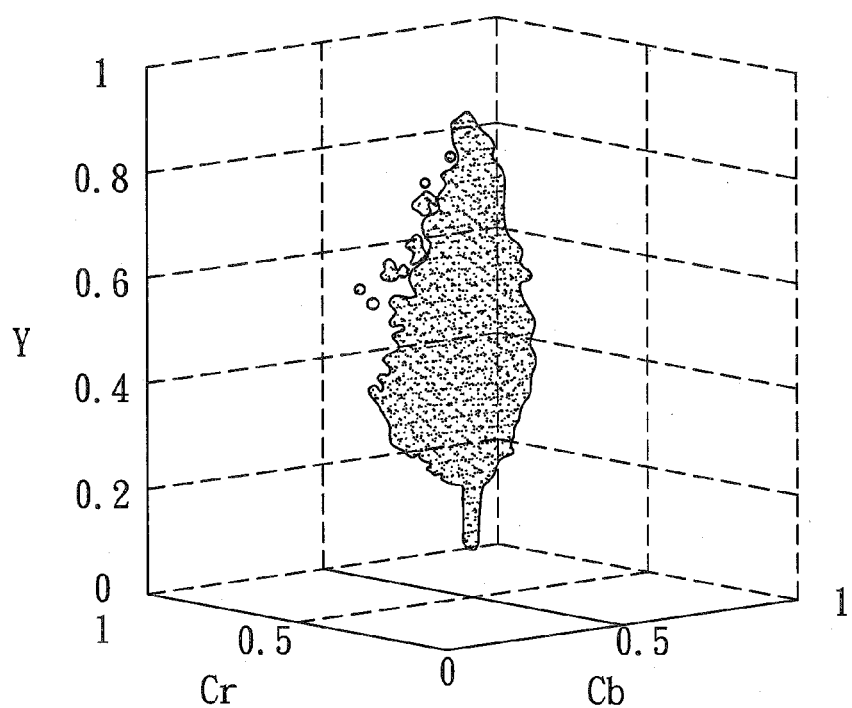

With respect to the grayness metric, it measures how far the color distribution of an image composite is away from the center of, for example, the (three-dimensional) YCbCr color space (step 19). The grayness of a color distribution is defined, in the embodiment, as the negative of the distance from the center of the YCbCr space to the nearest point of the color distribution of the image composite. In the embodiment, the grayness for the background and the foreground are separately measured. If the foreground and the background of an image composite have different color tendency in term of grayness, a hollow region between the foreground and the background appears. In step 20, the image composite is assessed according to the presence or absence of the hollowness region. FIG. 4A shows a foreground component 40 and a background component 42 in the YCbCr color space. In this case (step 21A), the foreground component 40 and the background component 42 have substantially different color distribution with respect to the center of the color space, and a hollow region is thus formed, indicating that they have low consistency of color tendency, and the image composite therefore may look unrealistic. FIG. 4B further shows both the foreground component and background component in the YCbCr color space. In this case (step 21B), the foreground component and the background component have substantially similar color distributions with respect to the center of the color space, and no hollow region is formed, indicating that they have high consistency of color tendency, and the image composite therefore may appear realistic.

According to the method of assessing realism of the image composite as illustrated above, the realism of the image composite may be objectively and accurately assessed in terms of color similarity and/or the color tendency (e.g., linearity or grayness), particularly by using only the information available from the single image composite to be improved. Moreover, the illustrated embodiments may facilitate automation in the process.

Figure 5:
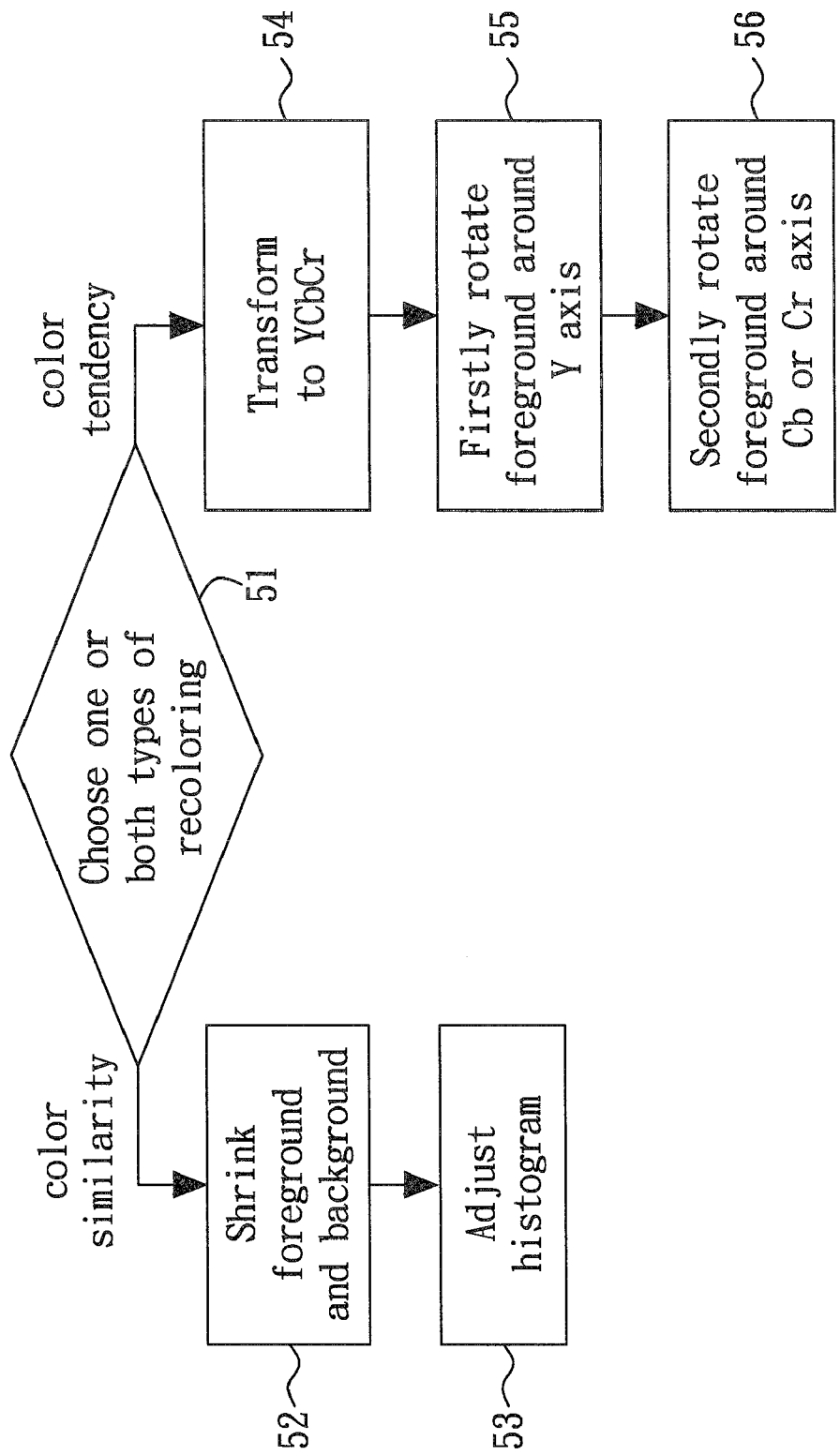
FIG. 5 is a flow diagram that illustrates a method of recoloring an image composite according to one embodiment of the present invention.

Based on one or more of the above measurements, the image composite may be further subjected to recoloring in order to improve its realism if desired or necessary. FIG. 5 is a flow diagram that illustrates a method of recoloring an image composite according to one embodiment of the present invention. In the embodiment, two types of recoloring are disclosed: color similarity and consistence of color tendency (e.g., linearity or grayness). One or both types of recoloring may be chosen (step 51) in order to improve the realism of the image composite.

With respect to the color similarity, a shrunk foreground and a shrunk background are obtained in step 52 according to a similar procedure described in step 12 of FIG. 1. Subsequently, the histogram of the shrunk foreground (or the inserted object) is adjusted such that the distribution of the shrunk foreground and the distribution of the shrunk background may then be matched (step 53). The adjustment may be performed, for example, by shifting and/or expanding the histogram distribution of the shrunk foreground. Alternatively, in other embodiments, the histogram of the shrunk background or the histograms of both the shrunk foreground and the background may be adjusted. In the present embodiment, the color of each foreground pixel is channel-by-channel transformed in CIE L*a*b* space:

$$c'=(\sigma_B/\sigma_F)(c-\mu_F)+\mu_B,$$

where c denotes the value of a pixel in the input image for a given channel, c' denotes the modified pixel value, $\mu$ denotes mean, and $\sigma$ denotes standard deviation, with subscript B standing for the shrunk background and F for the shrunk foreground.

Figure 6A:
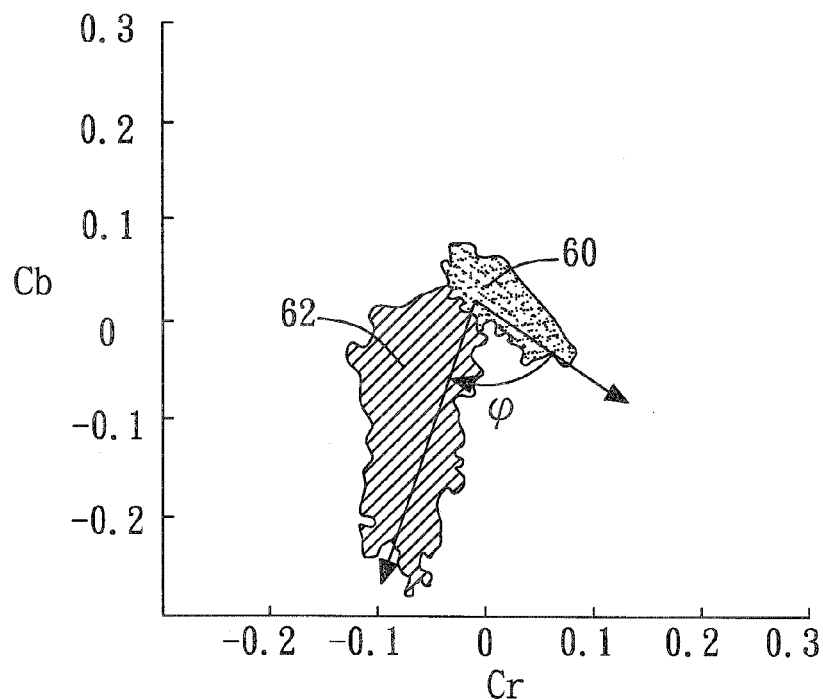
FIG. 6A and FIG. 6B show a number of foreground components and background components in the CbCr subspace.

With respect to the consistence of color tendency, in step 54, an image with an inserted object is transformed, for example, into YCbCr color space, if desired or necessary. Subsequently, in step 55, the color distribution of the foreground is firstly rotated around the Y axis such that the color distribution of the foreground may then be aligned or parallel with the color distribution of the background in the CbCr subspace. This rotation may remove the inconsistence of hue between the foreground and the background. FIG. 6A shows a foreground component 60 and a background component 62 in the CbCr subspace. In this case, the foreground component 60 is rotated clockwise with a rotation angle $\phi$.

Figure 6B:
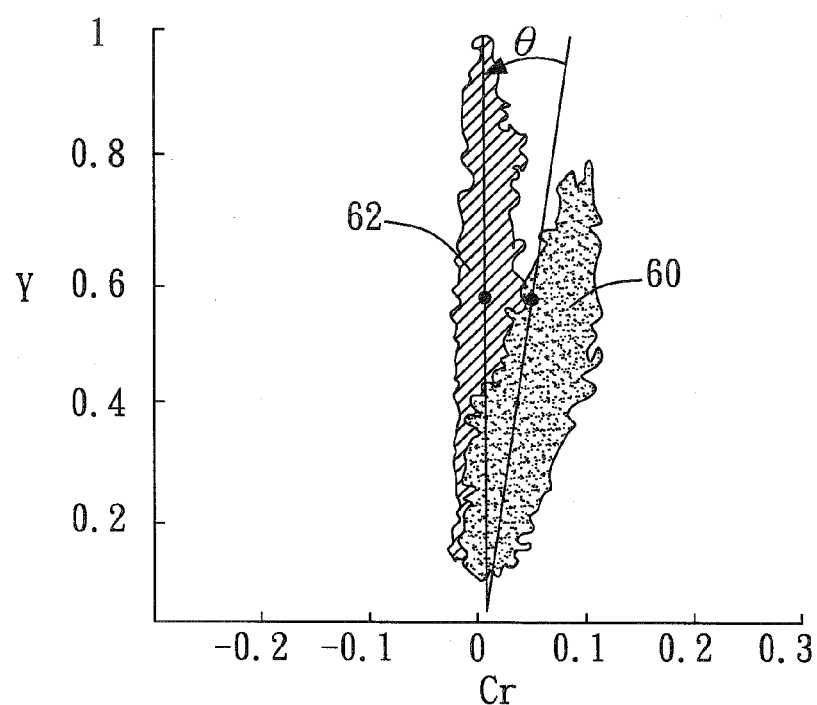

Afterwards, in step 56, the color distribution of the firstly rotated foreground is secondly rotated, if desired or necessary, around the Cb axis and/or Cr axis such that the color distribution of the foreground may then be aligned or parallel with the color distribution of the background in the YCr and/or YCb subspace. This rotation may handle an over-colorful object in an image. FIG. 6B shows a foreground component 60 and a background component 62 in the YCr subspace. In this case, the foreground component 60 is rotated counterclockwise with a rotation angle θ.

Although specific embodiments have been illustrated and described, it will be appreciated by those skilled in the art that various modifications may be made without departing from the scope of the present invention, which is intended to be limited solely by the appended claims.

What is claimed is:

1. A method of realism assessment of an image composite, comprising an image processor for performing the following steps:
    providing the image composite having a foreground and a background;
    transforming the foreground and the background image composite into a color space, wherein the transformed color space has a first axis representing luminance information, and a second axis and a third axis representing chromatic information;
    projecting the foreground and the background images to a subspace represented by the second axis and the third axis; and
    assessing the image composite, in the projected subspace, according to a linearity of color distribution of the foreground image and a linearity of color distribution of the background image, and further according to a relationship between the color distribution of the foreground image and the color distribution of the background image.

2. The method of claim 1, wherein the foreground image is an inserted object of the image composite.

3. The method of claim 1, wherein the transformed color space is YCbCr color space, and the first axis is Y axis, the second axis is Cb axis, and the third axis is Cr axis.

4. The method of claim 1, wherein the transformed color space is YUV color space or L*a*b* color space.

5. The method of claim 1, wherein the image composite is assessed as realistic when the foreground and the background images have linear color distributions that are approximately consistent or when neither the foreground nor the background image has a linear color distribution, and wherein the image composite is assessed as unrealistic when the foreground and the background images have linear color distributions that are substantially inconsistent.

6. The method of claim 1, further comprising a step of:
    firstly rotating color distribution of the foreground image and/or the background image around the first axis, such that the color distribution of the foreground image is approximately aligned or parallel with the color distribution of the background image in the projected subspace.

7. The method of claim 6, further comprising a step of:
    secondly rotating the color distribution of the foreground image and/or the background image around the second axis or the third axis, such that the color distribution of the foreground image is approximately aligned or parallel with the color distribution of the background image in a subspace represented by the first axis and the third axis or in a subspace represented by the first axis and the second axis.

8. A method of realism assessment of an image composite, comprising an image processor for performing the following steps:
    providing the image composite having a foreground and a background;
    transforming the foreground and the background image composite into a color space, wherein the transformed color space has a first axis representing luminance information, and a second axis and a third axis representing chromatic information;
    measuring distances between color distributions of the foreground and the background images respectively and a center of the transformed color space as grayness; and
    assessing the image composite, in the transformed color space, according to the measured grayness of the foreground image and the grayness of the background image.

9. The method of claim 8, wherein the foreground image is an inserted object of the image composite.

10. The method of claim 8, wherein the transformed color space is YCbCr color space, and the first axis is Y axis, the second axis is Cb axis, and the third axis is Cr axis.

11. The method of claim 8, wherein the transformed color space is YUV color space or L*a*b* color space.

12. The method of claim 8, wherein the grayness is measured as negative of a distance from the center of the transformed color space to a nearest point of the color distribution of the foreground or the background image.

13. The method of claim 8, wherein the image composite is assessed as unrealistic when a hollow region exists between the color distribution of the foreground image and the color distribution of the background image, and otherwise the image composite is assessed as realistic.

14. The method of claim 8, further comprising a step of:
    firstly rotating color distribution of the foreground image and/or the background image around the first axis, such that the color distribution of the foreground image is approximately aligned or parallel with the color distribution of the background image in a subspace represented by the first axis and the third axis or in a subspace represented by the first axis and the second axis.

15. The method of claim 14, further comprising a step of:
    secondly rotating the color distribution of the foreground image and/or the background image around the second axis or the third axis, such that the color distribution of the foreground image is approximately aligned or parallel with the color distribution of the background image in the subspace represented by the first axis and the third axis or in the subspace represented by the first axis and the second axis.

16. A method of realism assessment of an image composite, comprising an image processor for performing the following steps:
    providing the image composite having a foreground and a background;
    shrinking the foreground and the background image composite to obtain local color distributions of the foreground and the background images; and
    determining color similarity between the shrunk foreground image and the shrunk background image by histogram distance;

wherein the determined color similarity S is expressed as $$S = \frac{\sum_{N_L} \sum_{N_a} \sum_{N_b} \min(h^B(i_L, i_a, i_b), h^F(i_L, i_a, i_b))}{\min(M^B, M^F)},$$

where $h^B(.)$ and $h^F(.)$ and respectively, denote three-dimensional (3-D) histograms of the shrunk background image and the shrunk foreground image in CIE L*a*b* color space, $i_L$, $i_a$ and $i_b$ denote indices of the histograms for the L, a, and b channels, respectively, $N_L$, $N_a$, and $N_b$ denote numbers of histogram bins for the L, a, and b channels, respectively, and $M^B$ and $M^F$ denote magnitudes of the background and the foreground images.

17. The method of claim 16, wherein the foreground image is an inserted object of the image composite.

18. The method of claim 17, wherein the shrunk background image is a band region outside a boundary of the inserted object, and the shrunk foreground image is a band region inside the boundary of the inserted object.

19. The method of claim 16, further comprising a step of:
adjusting histogram of the shrunk foreground image and the shrunk background image such that distribution of the shrunk foreground image and distribution of the shrunk background image are approximately matched.

20. The method of claim 19, wherein the histogram adjustment is performed by:
transforming, channel-by-channel, color of each pixel of the shrunk foreground image in CIE L*a*b* space by using the following equation, $$c' = (\sigma_B/\sigma_F)(c - \mu_F) + \mu_B,$$

where c denotes a value of the pixel in an input image for a given channel, c' denotes a modified pixel value, µ denotes mean, σ denotes standard deviation, subscript B stands for the shrunk background image, and subscript F stands for the shrunk foreground image.

* * * * *